(12) United States Patent
Vance et al.

(10) Patent No.: US 9,369,542 B2
(45) Date of Patent: Jun. 14, 2016

(54) NETWORK-BASED PROCESSING OF DATA REQUESTS FOR CONTACT INFORMATION

(75) Inventors: Michael Steffen Vance, Kenmore, WA (US); Jeffrey Allen Armantrout, Woodinville, WA (US); Jessi E. Alva, Bellevue, WA (US); Teresa S. Valdez Klein, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 296 days.

(21) Appl. No.: 12/413,489

(22) Filed: Mar. 27, 2009

(65) Prior Publication Data

US 2010/0250606 A1    Sep. 30, 2010

(51) Int. Cl.
*G06F 17/30* (2006.01)
*H04L 29/08* (2006.01)
*H04M 1/2745* (2006.01)

(52) U.S. Cl.
CPC .......... *H04L 67/306* (2013.01); *G06F 17/3056* (2013.01); *H04M 1/274516* (2013.01)

(58) Field of Classification Search
CPC .................................................. G06F 17/3056
USPC .................................................. 707/732–734
See application file for complete search history.

(56) References Cited

U.S. PATENT DOCUMENTS

| | | |
|---|---|---|
| 4,723,209 A | 2/1988 | Hernandez et al. |
| D296,218 S | 6/1988 | Wells-Papanek et al. |
| D298,144 S | 10/1988 | Wells-Papanek et al. |
| 5,590,256 A | 12/1996 | Tchao et al. |
| D384,052 S | 9/1997 | Kodosky |
| D388,424 S | 12/1997 | DeMuro et al. |
| D391,948 S | 3/1998 | Eisenberg |
| 5,724,531 A | 3/1998 | Miyashita et al. |
| 5,751,980 A | 5/1998 | Musashi et al. |
| D395,427 S | 6/1998 | Arora et al. |
| 5,793,365 A | 8/1998 | Tang et al. |

(Continued)

FOREIGN PATENT DOCUMENTS

| | | |
|---|---|---|
| DE | 10155431 | 6/2003 |
| EP | 0767418 A1 | 4/1997 |

(Continued)

OTHER PUBLICATIONS

Alltel Launches 'My Circle,' a One-of-a-Kind Program That Gives Customers Free Calls to Any Network or Number They Choose, Business Wire, Apr. 20, 2006, pp. 1, New York.

(Continued)

*Primary Examiner* — Grace Park
(74) *Attorney, Agent, or Firm* — Knobbe, Martens, Olson & Bear, LLP

(57) ABSTRACT

A system, method and computer-readable media for managing contact information via a network-based interface. A network resource transmits a data request to a contact information processing service. The contact information processing service processes the data request in accordance with the parameters included in the data request and information maintained by the contact information processing service. Examples of the processing facilitated by the contact information processing service include contact identification routines, contact verification routines, group-based information routines, and communication information routines. The contact information processing service returns the results to the requesting network resource.

37 Claims, 9 Drawing Sheets

(56) References Cited

U.S. PATENT DOCUMENTS

| | | |
|---|---|---|
| 5,796,394 A | 8/1998 | Wicks et al. |
| D397,687 S | 9/1998 | Arora et al. |
| D398,595 S | 9/1998 | Baer et al. |
| 5,822,123 A | 10/1998 | Davis et al. |
| 5,867,226 A | 2/1999 | Wehmeyer et al. |
| 5,880,733 A | 3/1999 | Horvitz et al. |
| 5,889,517 A | 3/1999 | Ueda et al. |
| D415,483 S | 10/1999 | Decker |
| 5,987,107 A | 11/1999 | Brown |
| 5,987,469 A | 11/1999 | Lewis et al. |
| 6,006,200 A | 12/1999 | Boies et al. |
| 6,023,275 A | 2/2000 | Horvitz et al. |
| D424,036 S | 5/2000 | Arora et al. |
| D424,541 S | 5/2000 | Mugura |
| 6,104,398 A | 8/2000 | Cox, Jr. et al. |
| 6,130,726 A | 10/2000 | Darbee et al. |
| 6,144,863 A | 11/2000 | Charron |
| 6,151,059 A | 11/2000 | Schein et al. |
| D437,858 S | 2/2001 | Yasui et al. |
| 6,188,406 B1 | 2/2001 | Fong et al. |
| D438,873 S | 3/2001 | Wang et al. |
| 6,201,957 B1 | 3/2001 | Son et al. |
| D440,979 S | 4/2001 | Wang et al. |
| 6,222,921 B1 | 4/2001 | Mugura et al. |
| 6,226,367 B1 | 5/2001 | Smith et al. |
| 6,236,398 B1 | 5/2001 | Kojima et al. |
| 6,249,863 B1 | 6/2001 | Redford et al. |
| D445,426 S | 7/2001 | Wang et al. |
| D446,790 S | 8/2001 | Wang et al. |
| 6,313,877 B1 | 11/2001 | Anderson |
| 6,332,024 B1 | 12/2001 | Inoue et al. |
| D454,138 S | 3/2002 | Imamura et al. |
| D454,139 S | 3/2002 | Feldcamp |
| 6,359,635 B1 | 3/2002 | Perttunen |
| 6,393,430 B1 | 5/2002 | Van Ryzin |
| D459,361 S | 6/2002 | Inagaki |
| D463,444 S | 9/2002 | Istvan et al. |
| 6,460,181 B1 | 10/2002 | Donnelly |
| 6,486,870 B1 | 11/2002 | Kozu |
| D467,252 S | 12/2002 | Lee |
| D469,442 S | 1/2003 | Bohlen, Jr. et al. |
| D470,857 S | 2/2003 | Anderson et al. |
| D471,226 S | 3/2003 | Gray |
| 6,532,459 B1 * | 3/2003 | Berson |
| 6,538,635 B1 | 3/2003 | Ringot |
| D472,902 S | 4/2003 | Nashida et al. |
| D473,236 S | 4/2003 | Robbin et al. |
| D474,198 S | 5/2003 | Barnes |
| D474,778 S | 5/2003 | Barnes |
| D475,064 S | 5/2003 | Nashida et al. |
| 6,563,515 B1 | 5/2003 | Reynolds et al. |
| 6,577,330 B1 | 6/2003 | Tsuda et al. |
| 6,600,936 B1 | 7/2003 | Karkkainen et al. |
| D478,912 S | 8/2003 | Johnson |
| D485,279 S | 1/2004 | DeCombe |
| 6,678,891 B1 | 1/2004 | Wilcox et al. |
| D486,499 S | 2/2004 | Hayashi et al. |
| 6,741,268 B1 | 5/2004 | Hayakawa |
| 6,757,365 B1 | 6/2004 | Bogard |
| D495,339 S | 8/2004 | Gildred |
| 6,775,659 B2 | 8/2004 | Clifton-Bligh |
| 6,781,575 B1 | 8/2004 | Hawkins et al. |
| D495,715 S | 9/2004 | Gildred |
| 6,788,987 B2 | 9/2004 | Slechta et al. |
| 6,801,849 B2 | 10/2004 | Szukala et al. |
| 6,845,153 B2 | 1/2005 | Tiburtius et al. |
| 6,850,255 B2 | 2/2005 | Muschetto |
| 6,865,404 B1 | 3/2005 | Tikkala et al. |
| D506,474 S | 6/2005 | Gildred |
| 6,907,575 B2 | 6/2005 | Duarte |
| D507,577 S | 7/2005 | Totten et al. |
| 6,925,650 B1 | 8/2005 | Arsenault et al. |
| D510,581 S | 10/2005 | Robbin et al. |
| 6,959,207 B2 | 10/2005 | Keinonen et al. |
| 6,975,712 B1 | 12/2005 | Schnarel et al. |
| 6,978,473 B1 | 12/2005 | Nsonwu et al. |
| 7,007,239 B1 | 2/2006 | Hawkins et al. |
| 7,036,091 B1 | 4/2006 | Nguyen et al. |
| 7,046,993 B2 | 5/2006 | Haaramo et al. |
| D523,439 S | 6/2006 | Kuroda |
| D523,440 S | 6/2006 | Hernandez et al. |
| D523,868 S | 6/2006 | Kuroda |
| 7,083,109 B2 | 8/2006 | Pouchak |
| 7,086,008 B2 | 8/2006 | Capps et al. |
| 7,089,287 B2 | 8/2006 | Bellotti et al. |
| 7,099,862 B2 * | 8/2006 | Fitzpatrick et al. ........... 707/758 |
| D528,556 S | 9/2006 | Decombre |
| 7,111,788 B2 | 9/2006 | Reponen |
| 7,117,445 B2 | 10/2006 | Berger |
| 7,137,073 B2 | 11/2006 | Kim et al. |
| 7,174,516 B2 | 2/2007 | Chipchase |
| 7,178,109 B2 | 2/2007 | Hewson et al. |
| 7,187,761 B2 | 3/2007 | Bookstaff |
| D540,340 S | 4/2007 | Cummins |
| D543,986 S | 6/2007 | Rimas-Ribikauskas et al. |
| D543,987 S | 6/2007 | Rimas-Ribikauskas et al. |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,231,229 B1 | 6/2007 | Hawkins et al. |
| 7,236,576 B2 | 6/2007 | Schnarel et al. |
| 7,236,780 B2 | 6/2007 | Benco et al. |
| D545,827 S | 7/2007 | Evans et al. |
| D545,832 S | 7/2007 | Armendariz |
| D546,342 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,239 S | 8/2007 | Rimas-Ribikauskas et al. |
| D548,743 S | 8/2007 | Takahashi et al. |
| D550,681 S | 9/2007 | Totten et al. |
| D551,252 S | 9/2007 | Andre et al. |
| D552,114 S | 10/2007 | Tolle et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D557,268 S | 12/2007 | Fletcher |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,565 B2 | 3/2008 | Ying et al. |
| D565,586 S | 4/2008 | Shin et al. |
| D565,627 S | 4/2008 | Kase |
| D567,251 S | 4/2008 | Sadler |
| D567,817 S | 4/2008 | Kwag et al. |
| 7,353,034 B2 | 4/2008 | Haney |
| 7,360,174 B2 | 4/2008 | Grossman et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,298 S | 8/2008 | Chen et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D583,823 S | 12/2008 | Chen et al. |

(56) References Cited

U.S. PATENT DOCUMENTS

| | | |
|---|---|---|
| D584,737 S | 1/2009 | Stone et al. |
| D585,453 S | 1/2009 | Chen et al. |
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D588,150 S | 3/2009 | Stone et al. |
| 7,503,014 B2 | 3/2009 | Tojo et al. |
| D589,970 S | 4/2009 | Bhat et al. |
| D590,407 S | 4/2009 | Watanabe et al. |
| D590,412 S | 4/2009 | Saft et al. |
| 7,519,912 B2 | 4/2009 | Moody et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| 7,536,654 B2 | 5/2009 | Anthony et al. |
| D593,574 S | 6/2009 | Guimaraes et al. |
| D593,576 S | 6/2009 | Ball et al. |
| D594,015 S | 6/2009 | Singh et al. |
| D594,465 S | 6/2009 | Hong et al. |
| D594,872 S | 6/2009 | Akimoto |
| 7,543,245 B2 | 6/2009 | Irimajiri |
| 7,546,543 B2 | 6/2009 | Louch et al. |
| 7,555,727 B2 | 6/2009 | Hawkins et al. |
| D596,192 S | 7/2009 | Shotel |
| 7,562,304 B2 | 7/2009 | Dixon et al. |
| 7,577,700 B2 | 8/2009 | Tolson et al. |
| 7,580,363 B2 | 8/2009 | Sorvari et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,811 S | 9/2009 | Watanabe et al. |
| D599,812 S | 9/2009 | Hirsch |
| D599,813 S | 9/2009 | Hirsch |
| D599,814 S | 9/2009 | Ogura et al. |
| D601,153 S | 9/2009 | Setiawan et al. |
| 7,587,215 B2 | 9/2009 | Chakraborty et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,316 S | 11/2009 | Hoefnagels et al. |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| D607,002 S | 12/2009 | Jonasson et al. |
| 7,636,889 B2 | 12/2009 | Weber et al. |
| D608,364 S | 1/2010 | Walsh et al. |
| D608,366 S | 1/2010 | Matas |
| D608,367 S | 1/2010 | Scalisi et al. |
| D608,368 S | 1/2010 | Bamford |
| 7,646,745 B2 | 1/2010 | Caldwell et al. |
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| 7,665,033 B2 | 2/2010 | Byrne et al. |
| D611,056 S | 3/2010 | Langlois et al. |
| D611,484 S | 3/2010 | Mays et al. |
| D611,485 S | 3/2010 | Marashi |
| D611,489 S | 3/2010 | Bell et al. |
| D611,490 S | 3/2010 | Lee et al. |
| D612,394 S | 3/2010 | La et al. |
| D612,860 S | 3/2010 | Tarara et al. |
| 7,673,017 B2 | 3/2010 | Kim et al. |
| 7,685,520 B2 | 3/2010 | Rashkovskiy et al. |
| 7,685,530 B2 | 3/2010 | Sherrard et al. |
| D613,300 S | 4/2010 | Chaudhri |
| D613,747 S | 4/2010 | Jonasson et al. |
| D614,191 S | 4/2010 | Takano et al. |
| D614,192 S | 4/2010 | Takano et al. |
| D614,633 S | 4/2010 | Watanabe et al. |
| D614,643 S | 4/2010 | Viegers et al. |
| D614,646 S | 4/2010 | Chen et al. |
| 7,702,543 B2 | 4/2010 | MacKay et al. |
| 7,703,031 B2 | 4/2010 | Nakagawa et al. |
| 7,705,833 B2 | 4/2010 | Kim |
| D615,090 S | 5/2010 | Sogabe |
| D615,546 S | 5/2010 | Lundy et al. |
| D615,549 S | 5/2010 | Caine et al. |
| 7,720,498 B2 | 5/2010 | Lee |
| D617,804 S | 6/2010 | Hirsch |
| D617,805 S | 6/2010 | Scalisi et al. |
| D618,250 S | 6/2010 | Stallings et al. |
| 7,735,021 B2 | 6/2010 | Padawer et al. |
| 7,738,912 B1 | 6/2010 | Hawkins et al. |
| D619,593 S | 7/2010 | Fujioka et al. |
| D619,594 S | 7/2010 | Jonasson et al. |
| D620,948 S | 8/2010 | Scalisi et al. |
| D621,844 S | 8/2010 | Van Os |
| D621,845 S | 8/2010 | Anzures et al. |
| D622,280 S | 8/2010 | Tarara |
| 7,779,358 B1 | 8/2010 | Gupta et al. |
| D624,556 S | 9/2010 | Chaudhri |
| 7,797,641 B2 | 9/2010 | Karukka et al. |
| D625,325 S | 10/2010 | Vu et al. |
| D626,136 S | 10/2010 | Fujimura |
| D627,790 S | 11/2010 | Chaudhri |
| D628,206 S | 11/2010 | Lemay |
| 7,831,675 B2 | 11/2010 | Narayanaswami et al. |
| 7,898,600 B2 | 3/2011 | Lee et al. |
| D638,025 S | 5/2011 | Saft et al. |
| 7,971,222 B2 | 6/2011 | Ellis |
| 8,015,187 B2 | 9/2011 | Choi et al. |
| 8,032,470 B1 | 10/2011 | Heidenreich et al. |
| 8,046,801 B2 | 10/2011 | Ellis et al. |
| D652,843 S | 1/2012 | van Os |
| 8,631,351 B2 | 1/2014 | Fong et al. |
| 2001/0044743 A1 | 11/2001 | McKinley et al. |
| 2001/0046886 A1 | 11/2001 | Ishigaki |
| 2002/0045960 A1 | 4/2002 | Phillips et al. |
| 2002/0052754 A1 | 5/2002 | Joyce et al. |
| 2002/0054164 A1 | 5/2002 | Uemura |
| 2002/0059201 A1* | 5/2002 | Work .................. 707/3 |
| 2002/0145623 A1 | 10/2002 | DeCombe |
| 2003/0014179 A1 | 1/2003 | Szukala et al. |
| 2003/0078033 A1 | 4/2003 | Sauer et al. |
| 2003/0164818 A1 | 9/2003 | Miller-Smith et al. |
| 2003/0210265 A1 | 11/2003 | Haimberg |
| 2003/0224816 A1 | 12/2003 | Kundaje et al. |
| 2004/0017376 A1 | 1/2004 | Tagliabue et al. |
| 2004/0041836 A1 | 3/2004 | Zaner et al. |
| 2004/0046796 A1 | 3/2004 | Fujita |
| 2004/0067751 A1 | 4/2004 | Vandermeijden et al. |
| 2004/0075691 A1 | 4/2004 | Moon |
| 2004/0077340 A1 | 4/2004 | Forsyth |
| 2004/0091093 A1 | 5/2004 | Bookstaff |
| 2004/0100479 A1 | 5/2004 | Nakano et al. |
| 2004/0102225 A1 | 5/2004 | Furuta et al. |
| 2004/0119758 A1 | 6/2004 | Grossman et al. |
| 2004/0122683 A1 | 6/2004 | Grossman et al. |
| 2004/0122684 A1 | 6/2004 | Kaikuranta |
| 2004/0133638 A1 | 7/2004 | Doss et al. |
| 2004/0155908 A1 | 8/2004 | Wagner |
| 2004/0162812 A1 | 8/2004 | Lane |
| 2004/0172455 A1 | 9/2004 | Green et al. |
| 2004/0185890 A1 | 9/2004 | Drozt et al. |
| 2004/0221239 A1 | 11/2004 | Hachigian et al. |

(56) References Cited

U.S. PATENT DOCUMENTS

| | | |
|---|---|---|
| 2004/0235520 A1* | 11/2004 | Cadiz et al. .................. 455/557 |
| 2004/0236749 A1 | 11/2004 | Cortright et al. |
| 2004/0237048 A1 | 11/2004 | Tojo et al. |
| 2004/0239982 A1 | 12/2004 | Gignac |
| 2004/0250217 A1 | 12/2004 | Tojo et al. |
| 2004/0268228 A1 | 12/2004 | Croney et al. |
| 2004/0268265 A1 | 12/2004 | Berger |
| 2005/0005235 A1 | 1/2005 | Satterfield et al. |
| 2005/0010876 A1 | 1/2005 | Robertson et al. |
| 2005/0020243 A1 | 1/2005 | Benco et al. |
| 2005/0033603 A1 | 2/2005 | Suzuki et al. |
| 2005/0033698 A1 | 2/2005 | Chapman |
| 2005/0039140 A1 | 2/2005 | Chen |
| 2005/0041011 A1 | 2/2005 | Silfverberg et al. |
| 2005/0071780 A1 | 3/2005 | Muller et al. |
| 2005/0079863 A1 | 4/2005 | Macaluso |
| 2005/0086611 A1 | 4/2005 | Takabe et al. |
| 2005/0091272 A1 | 4/2005 | Smith et al. |
| 2005/0094205 A1 | 5/2005 | Lo et al. |
| 2005/0114374 A1 | 5/2005 | Juszkiewicz et al. |
| 2005/0118996 A1 | 6/2005 | Lee et al. |
| 2005/0120306 A1 | 6/2005 | Klassen et al. |
| 2005/0138574 A1 | 6/2005 | Lin |
| 2005/0143135 A1 | 6/2005 | Brems et al. |
| 2005/0143138 A1 | 6/2005 | Lee et al. |
| 2005/0160376 A1 | 7/2005 | Sciammarella et al. |
| 2005/0163290 A1 | 7/2005 | Gilles et al. |
| 2005/0172001 A1 | 8/2005 | Zaner et al. |
| 2005/0182837 A1 | 8/2005 | Harris et al. |
| 2005/0209994 A1 | 9/2005 | Noro et al. |
| 2005/0210104 A1 | 9/2005 | Torvinen |
| 2005/0229110 A1 | 10/2005 | Gegner et al. |
| 2005/0235225 A1 | 10/2005 | Pradhan et al. |
| 2005/0235226 A1 | 10/2005 | Watanabe et al. |
| 2005/0235251 A1 | 10/2005 | Arend et al. |
| 2005/0243979 A1 | 11/2005 | Starbuck et al. |
| 2005/0245236 A1 | 11/2005 | Servi et al. |
| 2005/0246654 A1 | 11/2005 | Hally et al. |
| 2005/0261011 A1 | 11/2005 | Scott |
| 2005/0261032 A1 | 11/2005 | Seo et al. |
| 2005/0278652 A1 | 12/2005 | Scholz |
| 2006/0009249 A1* | 1/2006 | Fu et al. .................. 455/518 |
| 2006/0010395 A1 | 1/2006 | Aaltonen |
| 2006/0030347 A1 | 2/2006 | Biswaas |
| 2006/0048076 A1 | 3/2006 | Vronay et al. |
| 2006/0053379 A1 | 3/2006 | Henderson et al. |
| 2006/0055700 A1 | 3/2006 | Niles et al. |
| 2006/0084410 A1 | 4/2006 | Sutaria et al. |
| 2006/0101350 A1 | 5/2006 | Scott |
| 2006/0112354 A1 | 5/2006 | Park et al. |
| 2006/0123360 A1 | 6/2006 | Anwar et al. |
| 2006/0140015 A1 | 6/2006 | Kasamsetty |
| 2006/0141996 A1 | 6/2006 | Huh |
| 2006/0143574 A1 | 6/2006 | Ito et al. |
| 2006/0146765 A1 | 7/2006 | Van De Sluis et al. |
| 2006/0148499 A1 | 7/2006 | Chie |
| 2006/0148522 A1 | 7/2006 | Chipchase et al. |
| 2006/0168539 A1 | 7/2006 | Hawkins et al. |
| 2006/0174121 A1 | 8/2006 | Omae et al. |
| 2006/0212829 A1 | 9/2006 | Yahiro et al. |
| 2006/0223518 A1 | 10/2006 | Haney |
| 2006/0224675 A1* | 10/2006 | Fox et al. .................. 709/206 |
| 2006/0242581 A1 | 10/2006 | Manion et al. |
| 2006/0242597 A1 | 10/2006 | Park |
| 2006/0253787 A1 | 11/2006 | Fogg |
| 2006/0277488 A1 | 12/2006 | Cok et al. |
| 2006/0293057 A1 | 12/2006 | Mazerski et al. |
| 2007/0011617 A1 | 1/2007 | Akagawa et al. |
| 2007/0027920 A1 | 2/2007 | Alvarado et al. |
| 2007/0032267 A1 | 2/2007 | Haitani et al. |
| 2007/0033540 A1 | 2/2007 | Bridges et al. |
| 2007/0043688 A1 | 2/2007 | Kountz et al. |
| 2007/0060206 A1 | 3/2007 | Dam Nielsen et al. |
| 2007/0067738 A1 | 3/2007 | Flynt et al. |
| 2007/0072586 A1 | 3/2007 | Morhenn et al. |
| 2007/0073874 A1 | 3/2007 | Moghaddam et al. |
| 2007/0079246 A1 | 4/2007 | Morillon et al. |
| 2007/0118813 A1 | 5/2007 | Forstall et al. |
| 2007/0129112 A1 | 6/2007 | Tarn |
| 2007/0135103 A1 | 6/2007 | Middleton |
| 2007/0136687 A1 | 6/2007 | Pak |
| 2007/0162862 A1 | 7/2007 | Ogasawara et al. |
| 2007/0168262 A1 | 7/2007 | Morotomi et al. |
| 2007/0174389 A1 | 7/2007 | Armstrong et al. |
| 2007/0198947 A1 | 8/2007 | Cox et al. |
| 2007/0226645 A1 | 9/2007 | Kongqiao et al. |
| 2007/0250936 A1 | 10/2007 | Nakamura et al. |
| 2007/0268908 A1 | 11/2007 | Linkola et al. |
| 2007/0271528 A1 | 11/2007 | Park et al. |
| 2008/0022228 A1 | 1/2008 | Kwon et al. |
| 2008/0034317 A1 | 2/2008 | Fard et al. |
| 2008/0059570 A1 | 3/2008 | Bill |
| 2008/0081653 A1* | 4/2008 | Mock et al. .................. 455/518 |
| 2008/0086703 A1 | 4/2008 | Flynt et al. |
| 2008/0098311 A1 | 4/2008 | Delarue et al. |
| 2008/0111826 A1 | 5/2008 | Endrikhovski et al. |
| 2008/0122870 A1 | 5/2008 | Brodersen et al. |
| 2008/0158189 A1 | 7/2008 | Kim |
| 2008/0172030 A1 | 7/2008 | Blomquist |
| 2008/0189614 A1 | 8/2008 | Jeong et al. |
| 2008/0189627 A1 | 8/2008 | Nikitin et al. |
| 2008/0194934 A1 | 8/2008 | Ray et al. |
| 2008/0215978 A1 | 9/2008 | Bamba |
| 2008/0220751 A1 | 9/2008 | De Bast |
| 2008/0220752 A1 | 9/2008 | Forstall et al. |
| 2008/0235248 A1 | 9/2008 | Krantz et al. |
| 2008/0256170 A1 | 10/2008 | Hayashi et al. |
| 2008/0261569 A1 | 10/2008 | Britt et al. |
| 2008/0263069 A1 | 10/2008 | Harris et al. |
| 2008/0280600 A1 | 11/2008 | Zhou |
| 2008/0282158 A1 | 11/2008 | Aaltonen et al. |
| 2008/0288612 A1 | 11/2008 | Kwon |
| 2008/0288880 A1 | 11/2008 | Reponen et al. |
| 2009/0040875 A1 | 2/2009 | Buzescu et al. |
| 2009/0043847 A1* | 2/2009 | Laurila .................. 709/204 |
| 2009/0077496 A1 | 3/2009 | Aravamudan et al. |
| 2009/0164923 A1 | 6/2009 | Ovi |
| 2009/0187630 A1 | 7/2009 | Narayanaswami et al. |
| 2009/0193512 A1* | 7/2009 | Buckley .......... H04L 29/12047 726/9 |
| 2009/0199120 A1 | 8/2009 | Baxter et al. |
| 2009/0228513 A1* | 9/2009 | Tian .................. 707/102 |
| 2009/0300518 A1 | 12/2009 | Mock et al. |
| 2009/0303188 A1 | 12/2009 | Triplett |
| 2010/0004008 A1 | 1/2010 | Abolrous et al. |
| 2010/0020727 A1 | 1/2010 | Narayan et al. |
| 2010/0020953 A1* | 1/2010 | Lidstrom et al. ......... 379/142.04 |
| 2010/0062753 A1* | 3/2010 | Wen et al. .................. 455/418 |
| 2010/0064231 A1* | 3/2010 | Gupta .................. 715/748 |
| 2010/0094837 A1* | 4/2010 | O'Sullivan et al. ......... 707/705 |
| 2010/0144331 A1* | 6/2010 | Koberg et al. .............. 455/418 |
| 2010/0180001 A1 | 7/2010 | Hardt |
| 2010/0190467 A1 | 7/2010 | Scott et al. |
| 2010/0190468 A1 | 7/2010 | Scott et al. |
| 2010/0241544 A1 | 9/2010 | Benson et al. |
| 2010/0245262 A1 | 9/2010 | Vance et al. |
| 2010/0248701 A1 | 9/2010 | Vance et al. |
| 2010/0287504 A1 | 11/2010 | Vance et al. |
| 2010/0333029 A1 | 12/2010 | Smith et al. |
| 2011/0258547 A1 | 10/2011 | Symons et al. |
| 2012/0071244 A1 | 3/2012 | Gillo et al. |
| 2013/0019173 A1 | 1/2013 | Kotler et al. |
| 2013/0019203 A1 | 1/2013 | Kotler et al. |
| 2013/0024780 A1 | 1/2013 | Sutedja et al. |
| 2013/0275897 A1 | 10/2013 | Vance et al. |
| 2013/0281161 A1 | 10/2013 | Vance et al. |
| 2013/0283180 A1 | 10/2013 | Vance et al. |
| 2014/0033071 A1 | 1/2014 | Gruber et al. |
| 2014/0220942 A1 | 8/2014 | Vance et al. |
| 2015/0072644 A1 | 3/2015 | Sherrard et al. |

(56) References Cited

U.S. PATENT DOCUMENTS

FOREIGN PATENT DOCUMENTS

| | | |
|---|---|---|
| EP | 1246434 | 10/2002 |
| EP | 1469374 A1 | 10/2004 |
| EP | 1482758 A1 | 12/2004 |
| EP | 1571808 | 9/2005 |
| EP | 1608190 A1 | 12/2005 |
| JP | 07-129363 | 5/1995 |
| JP | 08-123658 | 5/1996 |
| JP | 09-083630 | 3/1997 |
| JP | 09-311661 | 12/1997 |
| JP | H11-088496 | 3/1999 |
| JP | H11-327741 | 11/1999 |
| JP | 2000-259304 | 9/2000 |
| JP | 2000-348058 A | 12/2000 |
| JP | 2002-009899 A | 1/2002 |
| JP | 2003-198705 | 7/2003 |
| JP | 2004-208217 A | 7/2004 |
| JP | 2004-348601 A | 12/2004 |
| JP | 2005-072958 A | 3/2005 |
| JP | 3834039 B2 | 10/2006 |
| KR | 10-2002-0069964 A | 9/2002 |
| KR | 10-2004-0024967 A | 3/2004 |
| KR | 10-2005-0043148 A | 5/2005 |
| KR | 10-2006-0042808 A | 5/2005 |
| KR | 10-2007-0029009 A | 3/2007 |
| KR | 10-2008-0004127 A | 1/2008 |
| KR | 10-2008-0019614 A | 3/2008 |
| KR | 10-2008-0079716 A | 9/2008 |
| WO | WO 00/25501 | 5/2000 |
| WO | WO 03/044756 A1 | 5/2003 |
| WO | WO 03/062976 A1 | 7/2003 |
| WO | WO 2005/045799 A1 | 5/2005 |
| WO | WO 2005/064441 A1 | 7/2005 |
| WO | WO 2005/120112 A1 | 12/2005 |
| WO | WO 2006/016227 A2 | 2/2006 |
| WO | WO 2006/067567 A1 | 6/2006 |
| WO | WO 2007/093997 A1 | 8/2007 |
| WO | WO 2007/143678 A2 | 12/2007 |
| WO | WO 2008/030776 A2 | 3/2008 |
| WO | WO 2010/111610 A2 | 9/2010 |
| WO | WO 2010/111614 A2 | 9/2010 |
| WO | WO 2010/111637 A2 | 9/2010 |
| WO | WO 2010/111642 A2 | 9/2010 |
| WO | WO 2010/111643 A2 | 9/2010 |
| WO | WO 2010/111670 A2 | 9/2010 |
| WO | WO 2010/111675 A2 | 9/2010 |
| WO | WO 2010/111679 A2 | 9/2010 |

OTHER PUBLICATIONS

Alltel's 'My Circle' Plan Lets Subscribers Adds 10 Numbers for Unlimited Calls, Wireless News, Apr. 23, 2006, pp. 2, Coventry.
Cuneo, Alice Z., Alltel Gets Aggressive in Telecom War, Advertising Age, Apr. 24, 2006, vol. 77, Issue 17, pp. 8, 1 pg., Chicago (Midwest region edition).
Weisser, Cybele and Farnoosh Torabi. "What do you pay to stay connected?" Money Magazine, Nov. 24, 2003. http://money.cnn.com/2003/11/20/pf/portability_strategy_0312/index.htm.
AT&T, LG Xenon User Guide, Apr. 8, 2009, pp. 1-146.
Boy Genius. "LG Xenon hitting AT&T before Christmas?" Boy Genius Report, Sep. 24, 2008. http://www.boygeniusreport.com/2008/09/24/lg-xenon-hitting-att-before-christmas/.
Belson, K., Alltel to Offer Free-Calling Plan, With Limits,, New York Times (Late Edition (East Coast), Apr. 21, 2006, p. C9, New York.
MobileCom Provides All Residential Pay As You Go Subscribers the Ability to Talk for 1 Piaster Per Minute Day and Night, www.albawaba.com, Mar. 14, 2006.
Sellers, P., MCI Communications Yes, Brands Can Still Work Magic, www.money.cnn.com, Feb. 7, 1994.
"Alltel Corp at Lehman Brothers Worldwide Wireless, Wirelein, and Media Conference". Fair Disclosure Wire. May 22, 2006.
"Alltel's free wireless calling plan paying off", Virgil Larson, Knight Rider Tribune Business News, May 2005, 2 pages.

* cited by examiner

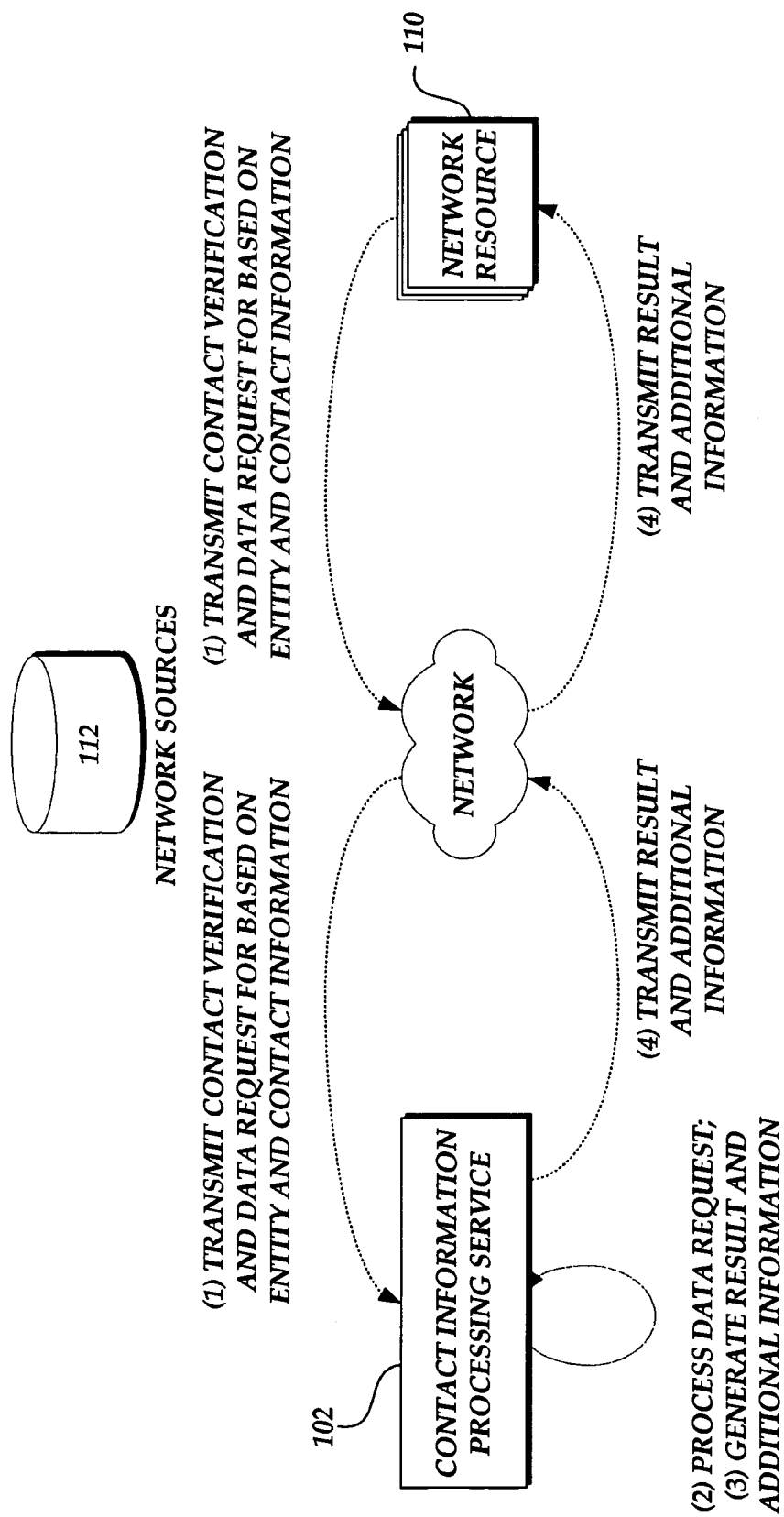

NETWORK-BASED PROCESSING OF DATA REQUESTS FOR CONTACT INFORMATION

BACKGROUND

Generally described, telecommunication devices and communication networks facilitate the collection and exchange of information. Utilizing a communication network and relevant communication protocols, a telecommunication device can engage in audio or data communications with other telecommunication devices, such as voice calls, video calls, messaging (e.g., short message service ("SMS") or multimedia messaging service ("MMS")), content streaming, instant messaging, resource browsing (e.g., Web browsing), and the like.

To facilitate communications, telecommunication devices can be associated with software and hardware components that allow the telecommunication device to maintain contact information, such as telephone numbers, email addresses, messaging addresses, etc., utilized to establish and engage in communications via available communication channels. Typically, such contact information is maintained as contact information in which all known contact information for an identified entity, such as user, can be presented to a telecommunication device user. For example, a telecommunication device may present a user interface in which the contact information associated with a selected individual is presented in a list-based format. In another example, a telecommunication device with voice calling functionality may maintain a "last call list" that keeps track of telephone numbers of the most recent incoming or outgoing calls from the telecommunication device.

Although contact management user interfaces and software can facilitate the input and management of contact information for a larger set of contacts, typical contact management approaches can become deficient as the set of entities associated with a user grows. In one example, typical call list approaches are limited in the number of contacts identified in the user interfaces (e.g., the last 4 numbers called). Accordingly, such approaches can become deficient as the number of incoming or outgoing communications (e.g., voice calls) increases because potentially desired contacts are removed from the display based on order of the most recent incoming or outgoing communications.

In another example, typical contact management approaches relate to the presentation of the entire set of contacts that are associated with a user, such as in alphabetical order. As the number of contacts maintained in the telecommunication device, or on behalf of the telecommunication device, users may have increased difficulty in identifying the contact information of specific entities. Additionally, for each contact, the typical contact management approach identifies all known contact information (e.g., phone numbers, IM aliases, email addresses, etc.) without regard to a desired, or preferred, communication method. Additionally, the typical contact management approach does not take into account the manner in which the contact was selected in presenting contact information.

In addition to the management of contact information accessible by a telecommunication device, current approaches to manage applications, or other executable components, on telecommunication device can be inefficient in relation to the incorporation of contacts. One approach to managing applications or other executable components relates to user interface in which the set of available application or executable components are presented in a desktop metaphor. In a typical desktop metaphor, each available application or executable component is represented on the user interface by a selectable display object that causes the initiation, or execution of the display object. For example, a user can initiate an email application by selecting a representative display object from the user interface. In another example, a user can interact with social networking services by selecting an executable component that generates an interface for posting information or displaying information. In such a desktop metaphor, the initiation and selection of applications or executable components are independent on the grouping of users. For example, assume a user that is a member of sports team wishes to access a game schedule, post pictures from a previous game to the other team members, and communicate a private message to the other team members. Under the typical desktop metaphor approach, such an individual would be required to independently access each corresponding application (e.g., a calendaring application, a sharing application and a messaging application) by selecting each application from the presentation of all available applications. Additionally, the user would further be required to utilize the interfaces presented by each selected application to control the receipt of information transmitted (e.g., an email distribution list and a sharing application distribution list). Accordingly, such approaches do not efficiently facilitate group-based interaction.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 2A-2D are block diagrams of the contact information environment of FIG. 1 illustrating the interaction between a contact information processing service and a network resources for providing the network various information;

DETAILED DESCRIPTION

Figure 1:
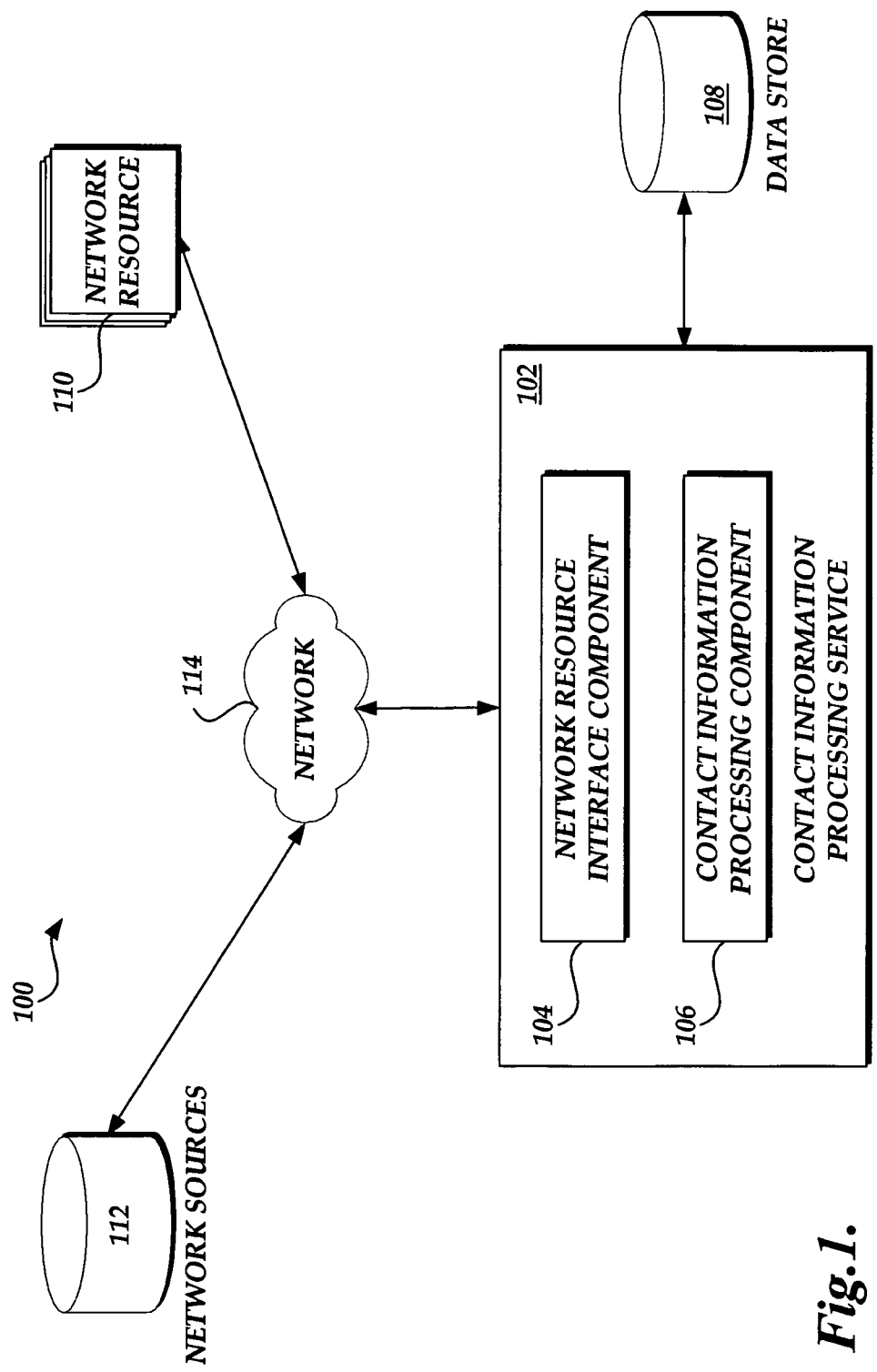
FIG. 1 is a block diagram illustrative of a telecommunication device user information environment including a contact information processing service and a number of network resources.

Generally described, aspects of the present disclosure relate to the management of information associated with a telecommunication device user. In an illustrative embodiment, a contact information processing service makes information associated with a telecommunication device user available to network resources. The information associated the telecommunication device user can include contact information, group-based information, and communication information. The information associated with the telecommunication device user, or user account, can be information maintained by, or otherwise accessible to, the contact information processing service. Additionally, some portion of the information may be maintained on the telecommunication device and accessible by the contact information processing service. Specifically, the contact information processing service facilitates access to the information associated with at telecommunication user via an application protocol interface ("API"). In accordance with an API, a network resource can request aspects of information associated with a telecommunications device user, or request processing in accordance with the information associated with a telecommunication device user.

As previously described, in an illustrative embodiment, contact information can include any information, such as telephone numbers, email addresses, messaging addresses, etc., utilized to establish and engage in communications. The contact information can include a set of information associated with one or more identifiable entities. Additionally, the identification of contacts (and the corresponding contact information) may be provided by multiple data sources, such as address books, data files, network sources, etc. Contact information may also include information defining access rights, privacy filters, etc. that can specify how information associated with the contact may be provided to other entities. Contact information can further include login/password information that provides access to other information about the contact that is maintained, or otherwise provided, by a third party network resource (e.g., a social networking network resource). Still further, contact information can include information regarding a user's preferences for communication activities, which can be further defined according to user context.

In an illustrative embodiment, the group-based information displays correspond to a collection of display objects representative of either contacts associated with a user or applications or other executable components that are executable, or otherwise accessible, via a telecommunication device. The group-based information displays can be logically organized according to subject matter organizational criteria. The subject matter organizational criteria can include, for example, organization or other affiliates criteria, event-based or activity based criteria, topic-based criteria, and the like. By accessing group-based information displays generated on a display, telecommunication device users can initiate one or more actions by the selection or manipulation of display objects corresponding to applications or executable components.

Illustratively, communication categories correspond to a logical organization of one or more communication activities that can be initiated, or cause to be initiated, by the telecommunication device. The communication categories do not correspond to the communication activities. Rather, they represent a collection of specific communication activities that are intended to achieve types of communication. Examples of communication categories can include, but are not limited to, sharing, calling, messaging, posting, broadcasting, and the like.

Although aspects of the present disclosure will be described with regard to an illustrative telecommunication device user environment and component interactions, communication protocols, flow diagrams and user interfaces, one skilled in the relevant art will appreciate that the disclosed embodiments are illustrative in nature and should not be construed as limiting. Specifically, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Additionally, although the present disclosure references a telecommunication device, one skilled in the relevant art will appreciate that a telecommunication device may also be referred to as a wireless computing device, a mobile communication device, or a computing device. Accordingly, reference to a telecommunication device should not be interpreted as including any particular functionality or operation not described in the present disclosure. Still further, although the present disclosure is described with regard to specific methodologies and frameworks for processing data requests, the present disclosure should not be construed to require combination of the disclosed embodiments or any specific variation unless such combination or variation is expressly identified.

With reference now to FIG. 1, a block diagram illustrative of a telecommunication device user environment 100 will be described. The telecommunication device user environment 100 can include a contact information processing service 102. In an illustrative embodiment, the contact information processing service 102 may be utilized to provide, or otherwise be responsive to, data requests for information provided by network resources, as will be described below. As illustrated in FIG. 1, the contact information processing service 102 can include a network resource interface component 104 for obtaining data requests from network resources 110. The contact information processing service 102 can also include a data request processing component 106 for processing data requests submitted by various network resources. In an illustrative embodiment, the data request processing component 106 processes the data requests in accordance with information maintained in a data store 108. While the data store 108 is depicted in FIG. 1 as being local to the contact information processing service 102, those skilled in the art will appreciate that the data store 108 may be remote to the contact information processing service 102 or may be a network based service itself One skilled in the relevant art will appreciate that the contact information processing service 102 may correspond to a number of computer devices, such as server computing devices. Accordingly, while the contact information processing service 102 is depicted in FIG. 1 as implemented by a single computing device in the telecommunication environment 100, this is illustrative only. The contact information processing service 102 may be embodied in a plurality of computing devices, each executing an instance of the communication service. A server or other computing device implementing the contact information processing service 102 may include memory, processing unit(s), and computer readable medium drive(s), all of which may communicate with one another by way of a communication bus. The network interface may provide connectivity over the network 112 and/or other networks or computer systems. The processing unit(s) may communicate to and from memory containing program instructions that the processing unit(s) executes in order to operate the contact information processing service 102. The memory generally includes RAM, ROM, and/or other persistent and auxiliary memory.

Additionally, the network resource interface component 104 and the data request processing component 108 may be implemented in a single computing device or across multiple computing devices. One skilled in the relevant art will also appreciate that the contact information processing service 102 may include any one of a number of additional hardware and software components that would be utilized in the illustrative computerized network environment to carry out the illustrative functions of the service 102 or any of the individually identified components.

With continued reference to FIG. 1, the telecommunication device user environment 100 includes a number of network resources 110 that can correspond to any one of a variety of devices or applications that submit data requests to the contact information processing service 102 via the communication network 114. Examples of network resources including Web pages or other nodes on a network that are operative to issues data requests, software applications including network interfaces for issuing data requests, and the like. Network resources 110 may be hosted on a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. Additionally, the communication network 114 can include the Internet, intranets, private networks and point to point networks, are generally referred to as the "network." Finally, the telecommunication device user environment 100 can include network data sources 112 for providing external information, such as location data, contact data, and other supplemental data, to the contact information processing service 102. The contact information processing service 102 incorporate, directly or indirectly, the external information in the information responsive to the data request.

As previously described, in accordance with an aspect of the present disclosure, a network resource 110 can generate data requests to the contact information processing service 102 by utilizing one or more APIs defined, or otherwise provided by, the contact information processing service 102. Illustratively, a set of APIs can incorporate one or more data structures in which specific information, such as an entity identifier, is passed as a parameter to the contact information processing service 102. Additionally, the set of APIs can incorporate data structures in which information responsive to a data request is passed to the network resource 110 issuing the data request. Based on the information included in the data request and the information maintained in the data store 108, the contact information processing service 102 processes the data request to generate responsive information to the requesting network resource 110. The contact information processing service 102 then transmits the response information to the network resource 110.

With reference now to FIGS. 2A-2D, illustrative interactions with the components of the telecommunication device user environment 100 will be described. Although the present disclosure will be described with regard to interactions between a network resource 110 and a contact information processing service 102 via a communication network 108, one skilled in the relevant art will appreciate that such interaction may be practiced between alternative components in the telecommunication device user environment 100 or in conjunction with additional components. Additionally, although FIGS. 2A-2D individually illustrate single interactions between a network resource 110 and the contact information processing service 102, the illustrated interactions should not be construed as requiring any particular combination of interactions or an order for multiple interactions. Still further, additional or alternative sequences of interactions are not precluded. Accordingly, the illustrated interaction in FIGS. 2A-2D should not be construed as limiting.

Figure 2A:
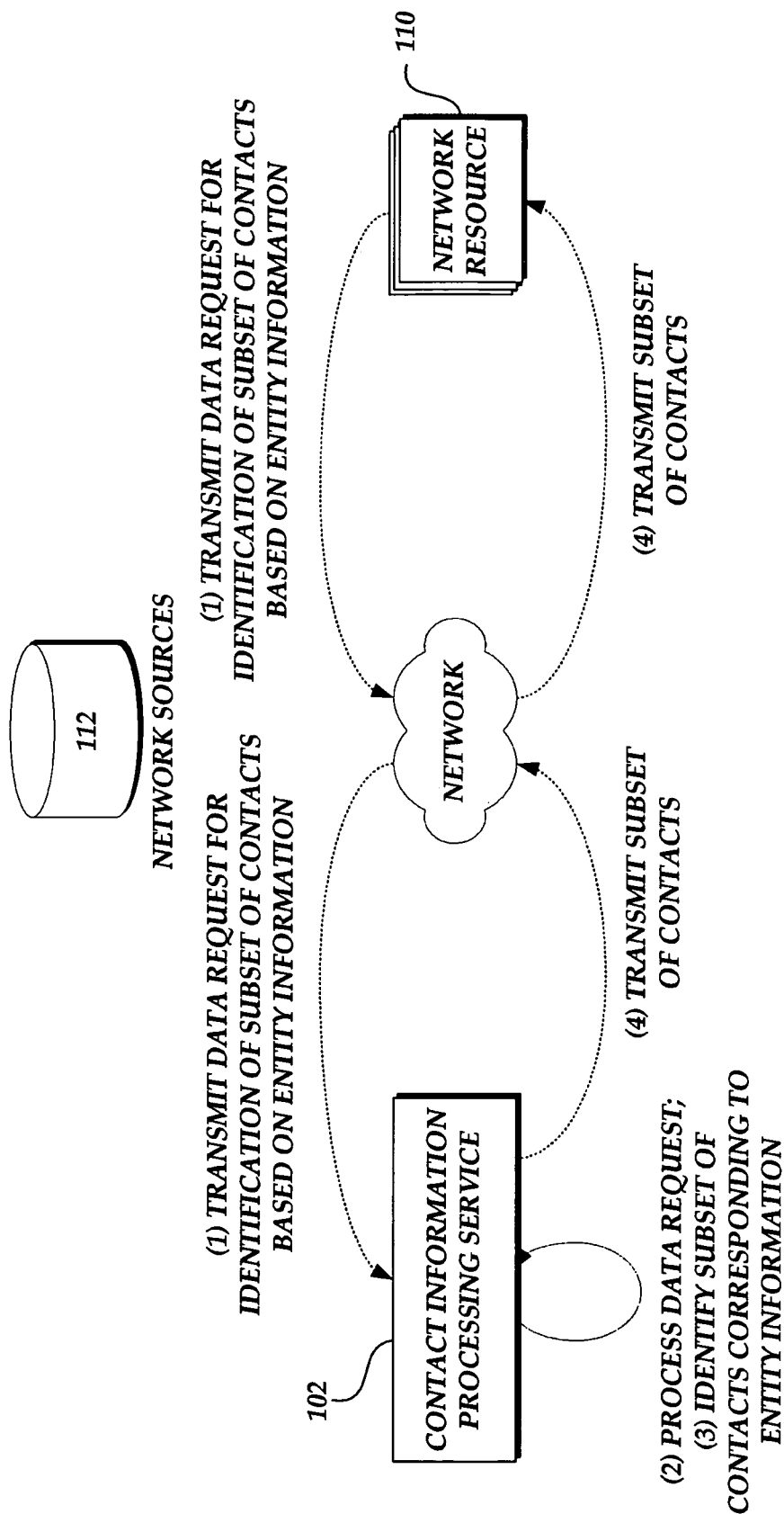

With reference to FIG. 2A, an illustrative interaction between a network resource 110 and the contact information processing service 102 for obtaining an identification of a subset of contacts associated with an identified entity, or set of entities, will be described. The network resource 110 initiates the data request by transmitting a request to the network resource that includes entity information. For example, the network resource 110 can utilize an API in which the entity information is passed as a parameter. Illustratively, the entity information may be passed in the API utilizing a variety of information including name, phone number, nicknames, temporary identifiers, unique identifiers (e.g., global unique identifiers "GUID"), group identifiers, and the like.

Based on the entity information included in the data request, the contact information processing service 102 processes the data request. In one embodiment, the contact information processing service 102 can identify a subset of contact information for each identified entity. The identified contact information does not have to include all possible contact information associated with the identified entity, such as in an address book. Rather, contact information processing service 102 can apply the contact filter information to a subset of the available contact information. The contact filter information can correspond to filter information provided by a user or a mobile service provider. For example, the set of contacts can be filtered based on contacts identified with a particular service level, communication preference, rate plan, etc. The contact filter information can further include keywords, tags or other criteria that can be applied to user profile information to find matching or substantially matching contacts (e.g. contacts associating with keywords, labels or tags). The contact information processing service 102 can then return the identified contact information as identifiers that can be accessed by the network resource 110. Alternatively, the identified contact information can include at least a portion of the contact information in the response.

Illustratively, the subset of contacts may be determined in a number of ways. In one example, the contact information processing service 102 can determine the subset of contacts based on a manual designation by a user associated with a telecommunications device, or other computing device. In another example, the contact information processing service 102 can determine automatically determine the subset of contacts. The automatic determination can be based a various factors, such as user context information, historical information (e.g., frequency of communication), profile matching, etc.

In another embodiment, the data request can include two or more specified entities. In this embodiment, the contact information processing service 102 identifies the subset of contacts for each identified entity in the manner described above. Additionally, the contact information processing service 102 can then further group, or otherwise process, the contact information to generate a group set of contact information. For example, the contact information processing service 102 may identify all common contacts for a set of specified entities. In another example, the contact information processing service 102 may identify all contacts not in common among the set of entities. In still a further example, the contact information processing service 102 can also identify, or provide, other information about the multiple entities, such as groups in common, communication categories in common, communication activities in common, preferences in common, and the like. One skilled in the relevant art will appreciate that any one of a variety of filtering/processing criteria may also be applied. The contact information processing service 102 can then return the processed contact information from the set of entities as identifiers that can be accessed by the network resource 110.

With reference to FIG. 2B, an illustrative interaction between a network resource 110 and the contact information processing service 102 for obtaining verification that an identified contact is associated with an identified entity, or set of entities, will be described. The network resource 110 initiates the data request by transmitting a request to the network resource that includes entity information. For example, the network resource 110 can utilize an API in which the entity information and a contact identifier are passed as parameters.

Based on the entity information and the contact information included in the data request, the contact information processing service 102 processes the data request. In one embodiment, the contact information processing service 102 can verify whether the identified contact is associated with a subset of contact information for the identified entity. As previously described, the set of contacts do not have to include all possible contact information associated with the identified entity, such as in an address book. Rather, contact information processing service 102 can apply the contact filter information to a subset of the available contact information. The contact information processing service 102 can then return an indication of whether the contact was found, or was otherwise associated with the contact information, for the specified entity.

In another embodiment, the data request can include a request to provide additional information associated with the identified contact if the contact is determined to be within the subset of contacts associated with the specified entity. For example, assume that a specified entity is associated with more than one subset of contacts (e.g., a subset of contacts corresponding to a "home" identifier and a subset of contacts corresponding to "work" identifier). Accordingly, the contact information processing service 102 can identify which particular subset, or subsets, found for the submitted contact. In another example, assume that contacts are associated with different rates plans/service plans that represent a communication cost to a telecommunications device user. Accordingly, the contact information processing service 102 can identify which cost plan or service plan that has been associated with the contact. Additionally, the contact information processing service 102 can return an estimated communication cost based on historical user information for the specified contact, sets of contacts or all contacts. In still another example, the contact information processing service 102 can identify communication preference information or communication history specified for the particular contact. In yet another example, the contact information processing service 102 can identify privacy information or subscription for the contact that specifies what type of information the contact is willing to provide (e.g., sharing phone numbers or personal contact information) and what type of information the contact will process (e.g., specify whether to provide the contact with social networking data feeds).

Figure 2C:
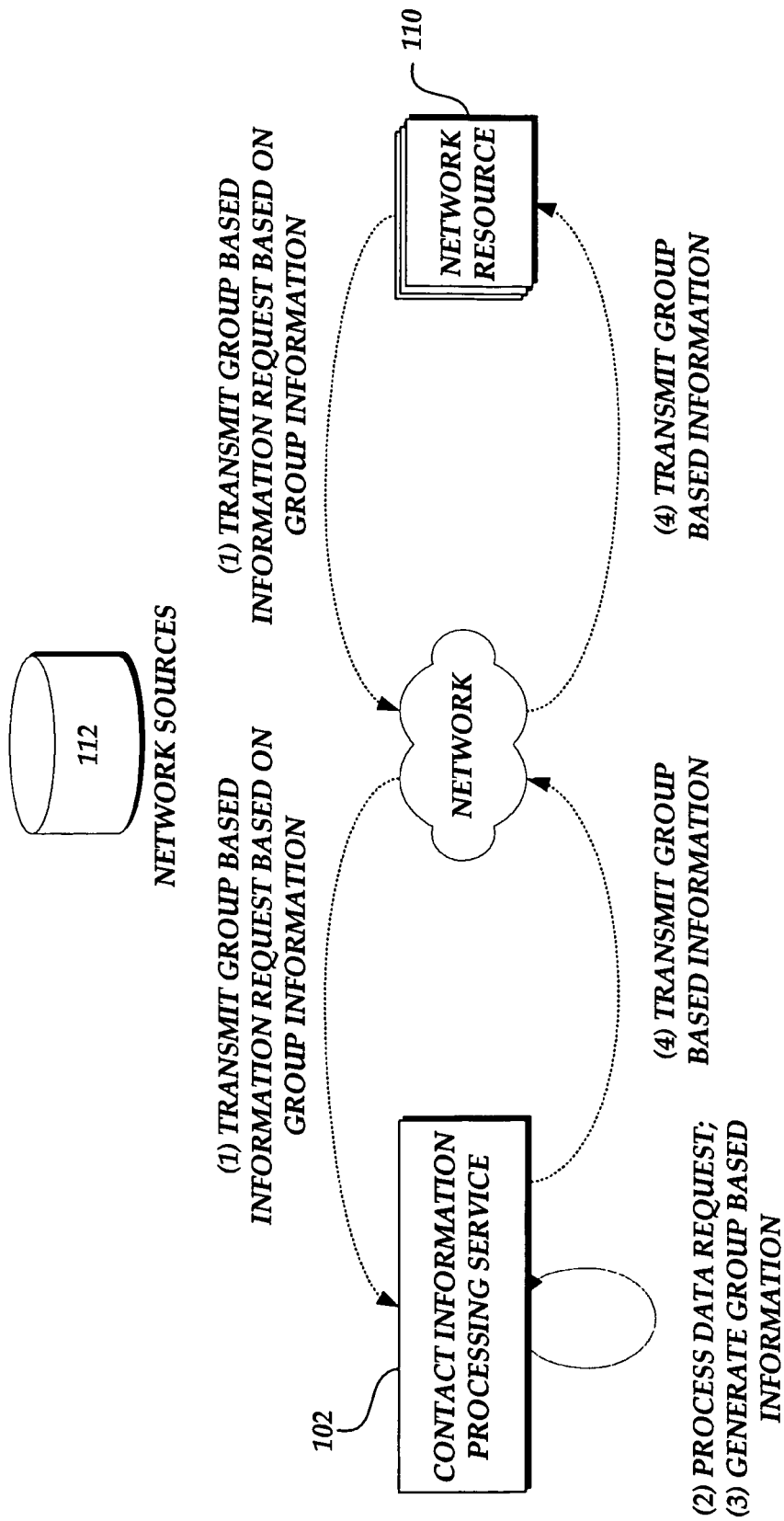

With reference to FIG. 2C, an illustrative interaction between a network resource 110 and the contact information processing service 102 for obtaining group-based information based on group information will be described. The network resource 110 initiates the data request by transmitting a request to the network resource that includes group information. For example, the network resource 110 can utilize an API in which the entity information or communication category information are passed as parameters. As previously described, the group-based information can be incorporated into group-based information displays that correspond to a collection of display objects representative of either contacts associated with a user or applications or other executable components that are executable, or otherwise accessible, via a device, such as a telecommunication device.

Based on the group information included in the data request, the contact information processing service 102 processes the data request. In one embodiment, the contact information processing service 102 can determine organizational criteria based on various criteria included as parameters in the data request, including entity identifiers and a set of contact identifiers. For example, the contact information processing service 102 can process information associated with a set of contacts to identify information common to each of the contacts (e.g., organization criteria, event criteria or topic/keyword criteria). In another embodiment, the organizational criteria may be included in the data request as a parameter of the data request submitted by the network resource.

Once the organizational criteria has been determined, or otherwise obtained, the contact information processing service 102 determines a set of one or more contacts associated with the user of the telecommunication device based on the organization criteria. If one or more contacts were included in the data request, the contact information processing service 102 can utilize the included set of contacts for the group-based information. Additionally, or alternatively, the contact information processing service 102 can add or remove contacts or determine the set of contacts independently. Additionally, the contact information processing service 102 determines a set of one or more applications or executable component to include in the group-based information based on the organizational criteria. The contact information processing service 102 can then return the group based information to the requesting network resource 110. An example of system for processing group-based information and illustrative group-based information display is disclosed in commonly assigned U.S. patent application Ser. No. 12/412,943, entitled Group Based Information Displays, filed Mar. 27, 2009, and incorporated by reference herein.

Figure 2D:
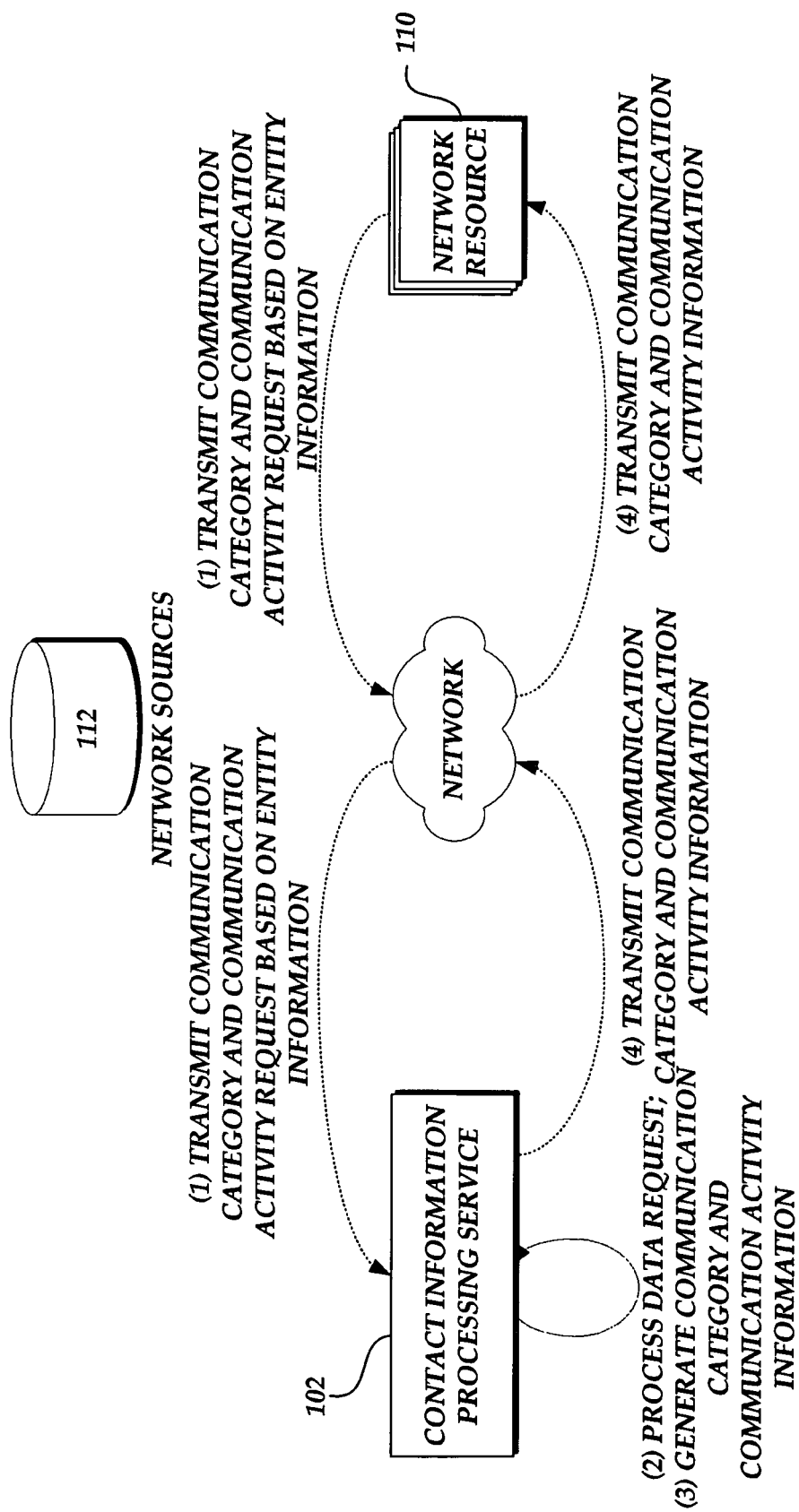

With reference to FIG. 2D, an illustrative interaction between a network resource 110 and the contact information processing service 102 for obtaining communication category and communication activity information will be described. The network resource 110 initiates the data request by transmitting a request to the network resource that includes a contact identifier corresponding to a selection of a contact or a communication category of previously provided communication category corresponding to a selected contact. For example, the network resource 110 can utilize an API in which the contact identifier(s) or a previously selected communication category is passed as a parameter of the API. As previously described, communication category information corresponds to a logical organization of one or more communication activities that can be initiated, or cause to be initiated, by the telecommunication device.

Based on the information included in the data request, the contact information processing service 102 processes the data request. In one embodiment, the contact information processing service 102 can determine one or more communication categories corresponding to the selected contact. For example, the contact information processing service 102 can process information associated with the specified contact to identify communication categories associated with the contact (e.g., "call," "share," "message," "direction communication," "asynchronous communication," etc.). Additionally, the contact information processing service 102 can also include an identification of the set of communication activities that are associated with each identified communication activity. In another embodiment, if the communication category is included in the data request, the contact information processing service 102 may return the set of communication activities associated with specified communication category. An example of system for processing communication category information and communication activity information and for generating associated displays incorporating communication category and communication activity information is disclosed in commonly assigned U.S. patent application Ser. No. 12/413,397, entitled "Managing Communications Utilizing Communication Categories," and filed on Mar. 27, 2009. U.S. patent application Ser. No. 12/413,397, is incorporated by reference herein.

With reference now to FIGS. 3-6, various flow diagrams of data request processing routines implemented by the content information processing service 102 will be described. Although the various routines will be described as being generally performed by the content information processing service 102, one skilled in the relevant art will appreciate that actions/steps outlined for the routines may be implemented by one or many computing devices/components that are associated with the telecommunication device user environment 100. Thus, the following illustrative embodiments should not be construed as limiting.

Figure 3:
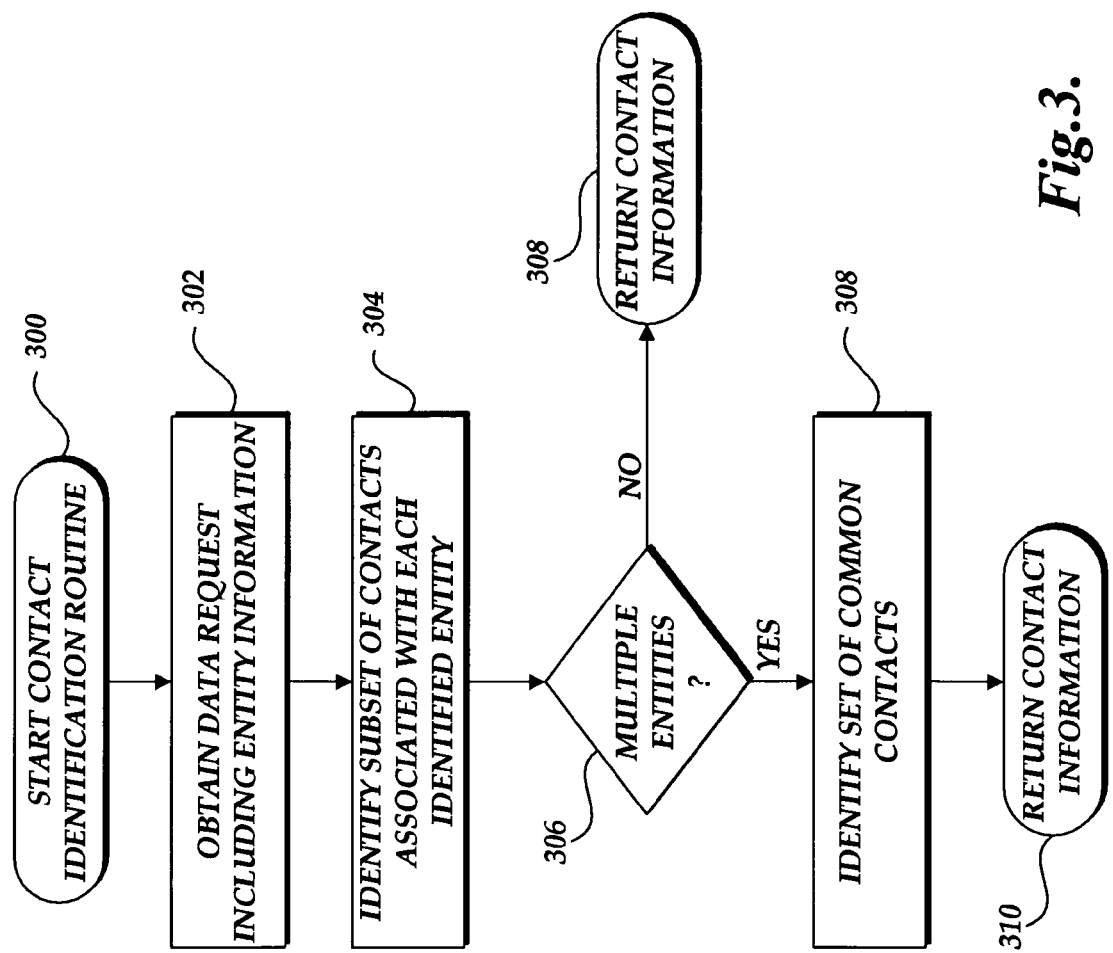
FIG. 3 is a flow diagram of an illustrative of a contact identification routine implemented by a contact information processing service responsive to a data request.

With reference to FIG. 3, a contact identification routine 300 will be described. At block 302, the contact information processing service 102 obtains a data request including entity information. As previously described, the data request can be in the form of a specified API, or set of APIs, in which the entity information is included as a parameter. In an illustrative embodiment, the entity information may be specified as identifiers corresponding to entities, names or partial names, or other information utilized to identify an entity or set of entities. At block 304, the contact information processing service 102 identifies a subset of contacts associated with each identified entity. As previously described, the subset of contact can correspond to contacts previously identified by an entity according to some criteria, such as rate plans, geographic criteria, organization criteria (e.g., work colleagues), manual designations (e.g., "my favorites"), and the like.

At decision block 306, a test is conducted to determine whether multiple entities were specified in the data request and whether a common set of contacts were requested. In an illustrative embodiment, the contact information processing service 102 can specify a subset of contacts for one or more identified entities and return the contact information as specified in block 308. Alternatively, if the multiple entities were specified in the data request or whether the data request included a specific request for identifying common contacts, the routine 300 proceeds to block 308. At block 308, the contact information processing service 102 identifies any overlapping contacts in the set of contact previously identified for each specified entity (block 304). One skilled in the relevant art will appreciate that any one of a variety of techniques may be implemented to identify common contacts. Additionally, the contact information processing service 102 may also identify a contact as being "common" so long as a contact is shared between two or more specified entities. Additionally, the contact information processing service 102 may rank, or otherwise prioritize contacts as a function of the number of entities to which the contact is found. At block 310, the contact information processing service 102 returns the set of contact information for each specified entity and the common contacts among the entities. In other embodiments, the contact information processing service 102 may only specify non-common contacts in the set of contacts associated with each specified entity. In further embodiments, the contact information processing service 102 may only return the common set of contact.

Figure 4:
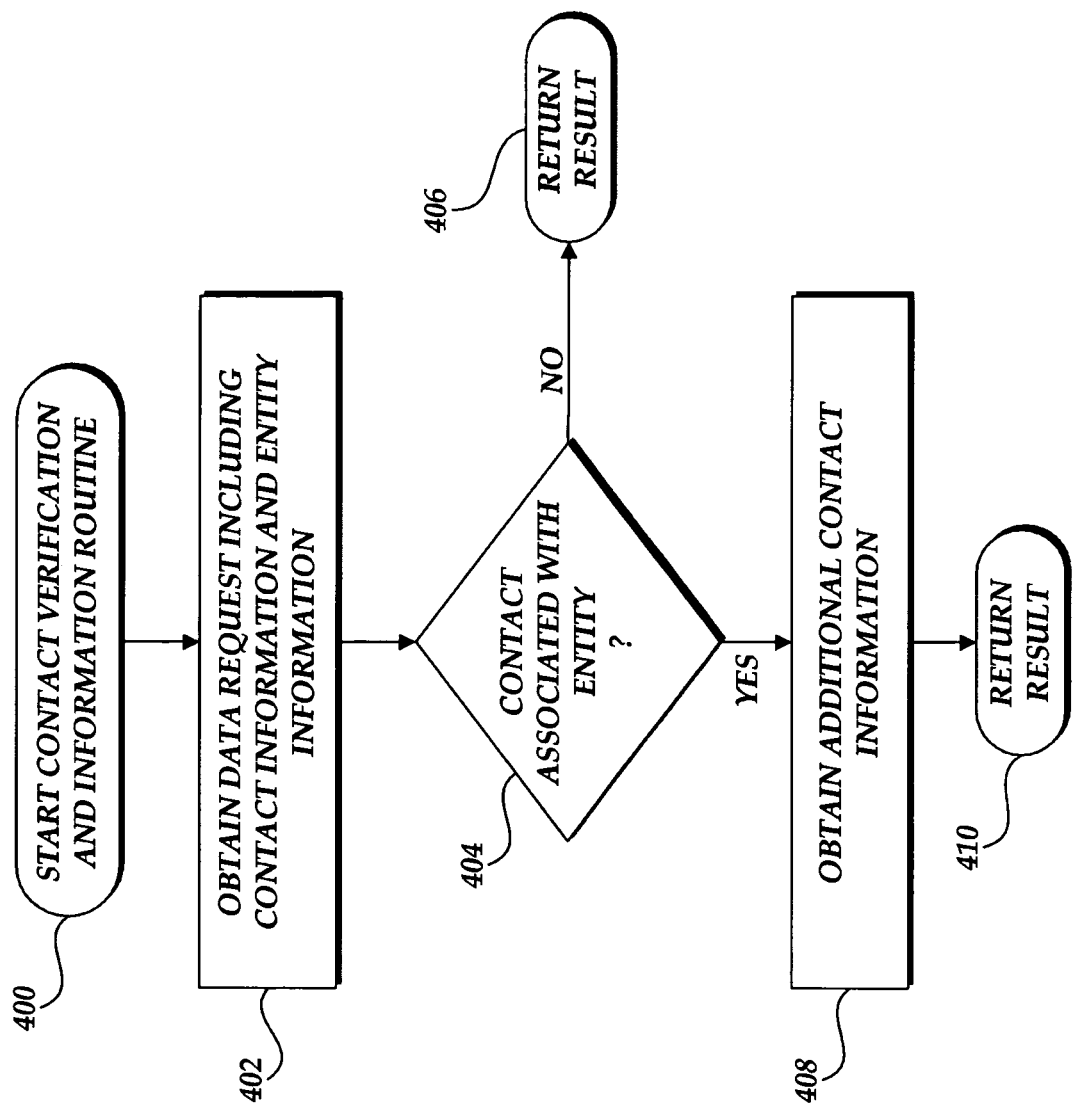
FIG. 4 is a flow diagram of an illustrative of a contact verification routine implemented by a contact information processing service responsive to a data request.

With reference to FIG. 4, a contact verification and information routine 400 will be described. At block 402, the contact information processing service 102 obtains a data request including contact and entity information. As previously described, the data request can be in the form of a specified API, or set of APIs, in which the contact and entity information are included as parameters. In an illustrative embodiment, the contact and entity information may be specified as identifiers corresponding to entities, names or partial names, GUIDs, group identifiers, or other information utilized to identify an entity or set of entities.

At decision block 404, a test is conducted to determine whether the specified contact is associated with the specified entity. For example, the contact information processing service 102 may determine whether the specified contact in included in a specific subset of contacts associated with the specified entity (e.g., the "my favorites" subset). The contact information processing service 102 may recall various subsets associated with the specified contact and attempt to match the specified entity in accordance with various text or information matching techniques. If the specified contact is not otherwise associated with the specified entity, at block 406, the contact information processing service 102 returns a negative result. The negative result may be binary corresponding to a "yes" or "no" answer. Alternative, the result may include additional information such as explanation of the searching process and a closest attempted match to facilitate a secondary review.

Alternatively, if the specified contact is associated with the specified entity, at block 408, the contact information processing service 102 can obtain, or otherwise identify, any additional information associated with the specified contact. As previously described, in an illustrative embodiment, a telecommunication device user can maintain multiple subsets of contacts according to different criteria. Additionally, a service provider, or other entity, can also classify contacts associated with a telecommunication device user, such as by rate plan, geographic distance, communication method (e.g., calling, messaging, etc.). Accordingly, for matching contacts, the contact information processing service 102 can identify descriptive information maintained about the contact as applicable to the specified entity. In another embodiment, the contact information processing service 102 can provide detailed information about the verified contact including communication preferences, privacy information, communication history, membership, social networking affiliations or identifiers, or additional information associated with the identified contact. At block 410, the contact information processing service 102 returns the verification of the entity as a contact and any applicable additional information. The routine 400 terminates.

Figure 5:
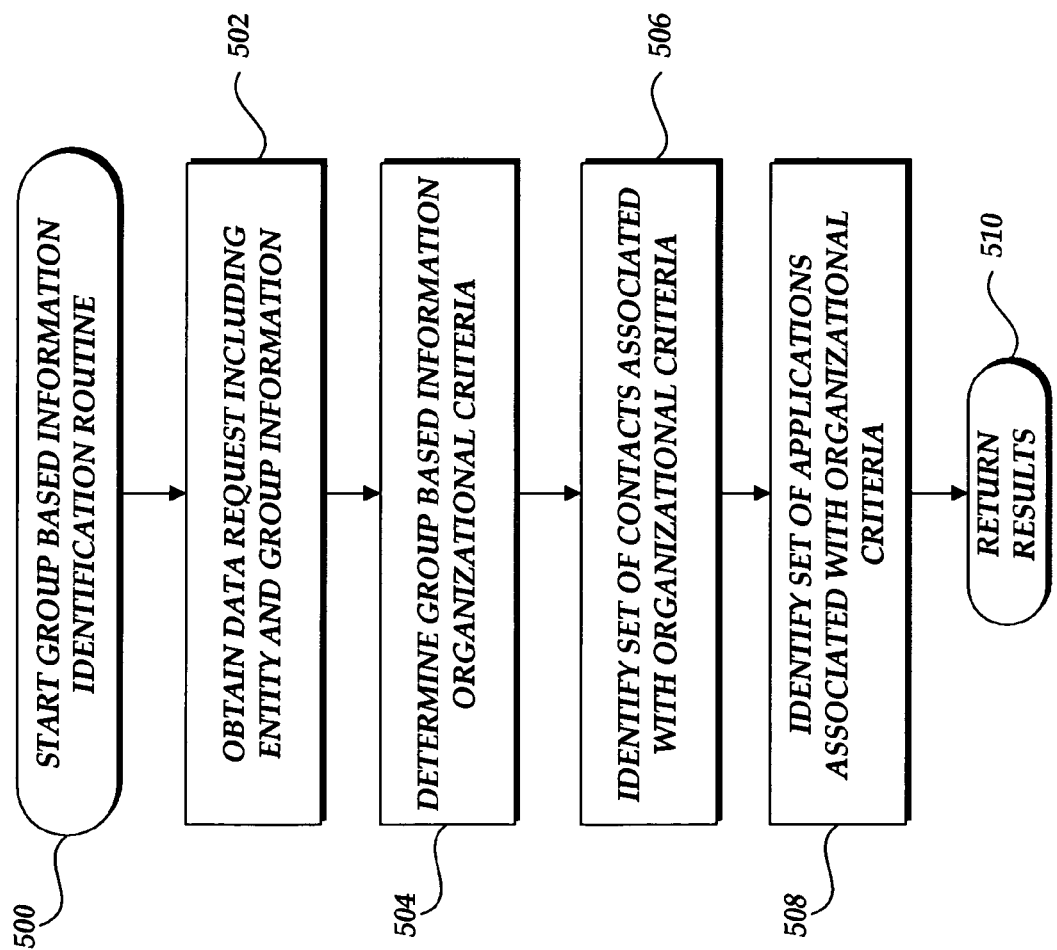
FIG. 5 is a flow diagram of an illustrative of a group-based information identification routine implemented by a contact information processing service responsive to a data request.

With reference to FIG. 5, a group-based information identification routine 500 will be described. At block 502, the contact information processing service 102 obtains a data request including group information. As previously described, the data request can be in the form of a specified API, or set of APIs, in which the entity information is included in a parameter. In an illustrative embodiment, the group information may be specified as organizational criteria, a contact identifier, and one or more contact identifiers.

At block 504, the contact information processing service 102 determines the organizational criteria that will be utilized to generate the group-based information. If the organizational criteria were specified as a parameter, block 504 may be omitted. As previously described, the contact information processing service 102 can utilize various data processing techniques to identify the organizational criteria. At block 506, the contact information processing service 102 identifies a set of contacts associated with the organizational criteria. In one embodiment, the contact information processing service 102 can utilize a set of contacts that were specified as parameter of the data request. Additionally, the contact information processing service 102 can modify the set of contacts based on the organizational criteria or other filtering criteria. If a set of contacts was not included in the data request, the contact information processing service 102 can identify appropriate contacts as described above. At block 508, the contact information processing service 102 identifies a set of applications or executable components according to the organizational criteria. In one embodiment, the contact information processing service 102 can configure the applications or executable components in accordance with the organizational criteria. At block 510, the contact information processing service 102 returns the results to the requesting network resource. In one embodiment, the group-based information may be returned as a set of identifiers that can be processed by the requesting network resource 110. Alternatively, the contact information processing service 102 may save the results in a network source 112 and facilitate access by the requesting network resource 110.

Figure 6:
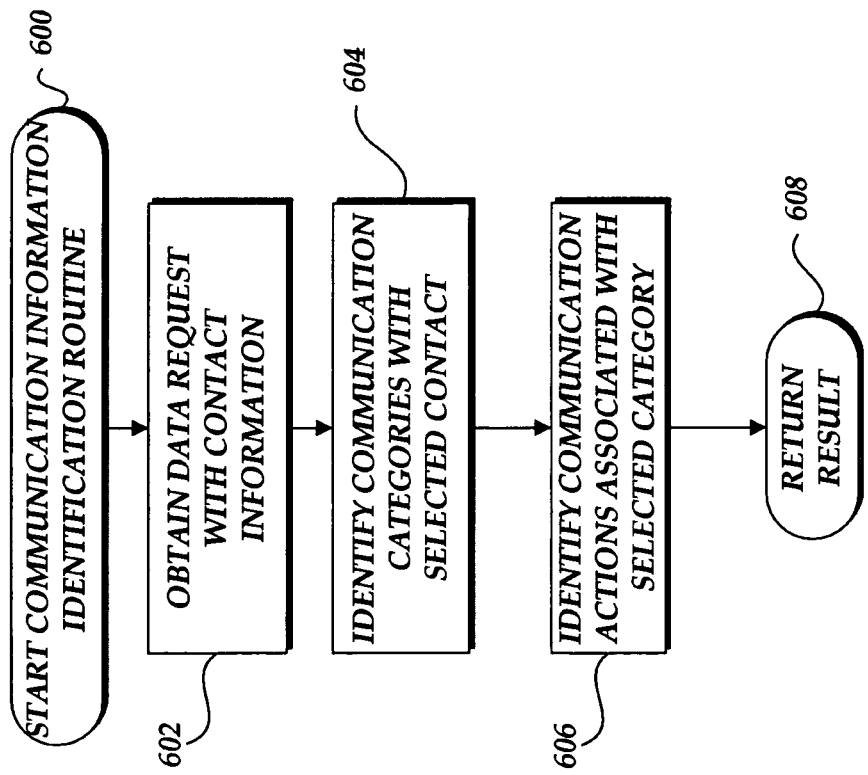
FIG. 6 is a flow diagram of an illustrative of a communication identification routine implemented by a contact information processing service responsive to a data request.

With reference to FIG. 6, a communication information identified routine 600 will be described. At block 302, the contact information processing service 102 obtains a data request including communication information. As previously described, the data request can be in the form of a specified API, or set of APIs, in which the communication information is included as a parameter. In an illustrative embodiment, the communication information may be specified as identifiers corresponding to contacts and communication category information associated with an identified contact.

At block 604, the contact information processing service 102 identifies one or more communication categories associated with a specified contact. As previously described, the communication category information corresponds to logical groupings of communication activities that may be used to communicate with an identified contact. At block 606, the contact information processing service 102 identifies any communication activities associated with the identified communication categories. Illustratively, the contact information processing service 102 may proceed to block 606 if the communication categories are specified in the data request. Additionally, the contact information processing service 102 can configure the communication activities in accordance with the identified contact. For example, the contact information processing service 102 can configure the communication activities associated with a "sharing" category with the appropriate distribution lists, identifiers, etc. At block 608, the contact information processing service 102 returns the identified information and the routine 600 terminates. In one embodiment, the communication category and communication activity information may be returned as a set of identifiers that can be processed by the requesting network resource 110. Alternatively, the contact information processing service 102 may save the results in a network source 112 and facilitate access by the requesting network resource 110.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof As such, reference in the disclosure to actions performed by a module or component relates to the execution of executable instructions by a processing device, or devices, to cause the referenced action to be preformed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing communications comprising:
a data store for maintaining data request information corresponding to an association of an identifiable entity to one or more contacts, plan information, group-based information, communication category information or communication activity information, the data request information maintained on behalf of the identifiable entity;
a computing device having a processor and a memory, the computing device operable to execute computer-executable instructions to implement a contact management component, the contact management component operative to:
obtain a data request to access the data store for the data request information associated with the identifiable entity and maintained on behalf of the identifiable entity, wherein the data request includes an identification of the identifiable entity and an indication of a specified contact, and wherein the data request does not identify a first subset and a second subset of a plurality of subsets of the one or more contacts associated with the identifiable entity;
process the data request to access the data store, wherein processing the data request includes verifying a plurality of associations between the specified contact and the identifiable entity based, at least in part, on the plurality of subsets of contacts, wherein each association of the plurality of associations corresponds to a respective subset of the plurality of subsets of contacts containing the specified contact;

determine communication cost information corresponding to a first association of the plurality of associations between the specified contact and the identifiable entity based, at least in part, on the data request and the plan information, wherein the first association corresponds to the first subset of contacts and wherein the communication cost information distinguishes the first association from at least one remaining association of the plurality of associations;

determine organizational criteria corresponding to a second association of the plurality of associations between the specified contact and the identifiable entity based, at least in part, on the data request and group information, wherein the second association corresponds to the second subset of contacts and wherein the organizational criteria distinguish the second association from at least one remaining association of the plurality of associations;

generate response information comprising the communication cost information corresponding to the first association between the specified contact and the identifiable entity and identifying a set of applications or executable components associated with the organizational criteria corresponding to the second association between the specified contact and the identifiable entity; and transmit the response information.

2. The system as recited in claim 1, wherein the data request information corresponding to the association of the identifiable entity to one or more contacts is based, at least in part, on a manual selection of a subset of contacts by the identifiable entity.

3. The system as recited in claim 1, wherein the data request information corresponding to the association of the identifiable entity to one or more contacts is based, at least in part, on an automatic selection of a subset of contacts to the identifiable entity.

4. The system as recited in claim 3, wherein the automatic selection of the subset of contacts is based, at least in part, on a frequency of communication.

5. The system as recited in claim 1, wherein the content management component obtains the data request in accordance with an application protocol interface.

6. The system as recited in claim 1, wherein the contact management component is operative to identify the first subset of contacts common to a plurality of identifiable entities.

7. The system as recited in claim 1, wherein the contact management component is further operative to identify contact description information for the specified contact as included in the first subset of contacts.

8. The system as recited in claim 7, wherein the contact description information corresponds to an identification of a type of contact.

9. The system as recited in claim 7, wherein the contact description information corresponds to information about the specified contact including at least one of communication preferences, communication history, or privacy information.

10. The system as recited in claim 1, wherein the group information is indicated in the data request and wherein the contact management component is further operative to identify the group-based information based, at least in part, on the organizational criteria.

11. The system as recited in claim 10, wherein the group-based information includes the second subset of contacts.

12. The system as recited in claim 10, wherein the group-based information includes the set of applications or executable components associated with the organizational criteria.

13. The system as recited in claim 1, wherein the contact management component is further operative to identify the group-based information based, at least in part, on an identification of a set of the one or more contacts.

14. The system as recited in claim 1, wherein the contact management component is further operative to identify at least one communication category based, at least in part, on the specified contact.

15. The system as recited in claim 1, wherein the contact management component is further operative to identify at least one communication activity based, at least in part, on a specified communication category.

16. The system as recited in claim 1, wherein the contact management component is further operative to identify the second subset of contacts.

17. A non-transitory computer-readable medium having computer-executable components, implemented by executing instructions on a processor associated with a computing device, the computer-executable components comprising:

an interface component operative to receive a data request corresponding to an identifiable entity, wherein the data request requests information maintained on behalf of the identifiable entity, wherein the data request includes an identification of at least one target contact, and wherein the data request does not identify a first subset and a second subset of a plurality of subsets of contacts associated with the identifiable entity; and a data request processing component operative to:

process the data request with regard to information accessible to the data request processing component, wherein the information accessible to the data request processing component comprises plan information maintained on behalf of the identifiable entity;

verify a first association of a plurality of associations between the at least one target contact and the identifiable entity based, at least in part, on the plurality of subsets of contacts, wherein each association of the plurality of associations corresponds to a respective subset of the plurality of subsets of contacts containing the at least one target contact;

determine communication cost information corresponding to the first association between the at least one target contact and the identifiable entity based, at least in part, on the data request and the plan information, wherein the first association corresponds to the first subset of contacts and wherein the communication cost information distinguishes the first association from at least one remaining association of the plurality of associations;

determine organizational criteria corresponding to a second association of the plurality of associations between the at least one target contact and the identifiable entity based, at least in part, on the data request and group information, wherein the second association corresponds to the second subset of contacts and wherein the organizational criteria distinguish the second association from at least one remaining association of the plurality of associations;

generate response information comprising the communication cost information corresponding to the first association and identifying a set of applications or executable components associated with the organizational criteria corresponding to the second association; and transmit the response information.

18. The computer-readable medium as recited in claim 17, wherein the data request processing component identifies the first subset of contacts based, at least in part, on a specification of at least one identifiable entity.

19. The computer-readable medium as recited in claim 18, wherein the data request processing component identifies the first subset of contacts common to two or more identifiable entities.

20. The computer-readable medium as recited in claim 18, wherein the data request processing component groups contacts common to two or more identifiable entities.

21. The computer-readable medium as recited in claim 17, wherein the data request processing component identifies contact description information for the at least one target contact as included in the first subset of contacts.

22. The computer-readable medium as recited in claim 17, wherein the data request processing component identifies at least one of communication preferences, communication history, associated groups, or privacy information for the at least one target contact as included in the first subset of contacts.

23. The computer-readable medium as recited in claim 17, wherein the data request processing component identifies group-based information based, at least in part, on the organizational criteria, the organizational criteria corresponding to group selection information.

24. The computer-readable medium as recited in claim 17, wherein the organizational criteria is derived from a specification of a set of contacts included in the information accessible to the data request processing component.

25. The computer-readable medium as recited in claim 17, wherein the data request processing component identifies at least one communication category based, at least in part, on a specification of the at least one target contact.

26. The computer-readable medium as recited in claim 17, wherein the information accessible to the data request processing component further comprises an indication of the first association.

27. The computer-readable medium as recited in claim 26, wherein the indication of the first association is provided manually by a user of a telecommunication device.

28. The computer-readable medium as recited in claim 17, wherein the information accessible to the data request processing component further comprises at least one of group-based information, communication category information or communication activity information.

29. The computer-readable medium as recited in claim 17, wherein the data request processing component is further operative to identify the second subset of contacts.

30. A computer-implemented method comprising:
obtaining a data request specified in accordance with an application protocol interface, the data request transmitted over a communication network, wherein the data request is submitted on behalf of an identifiable entity, wherein the data request includes an identification of at least one specified contact, and wherein the data request does not identify a first subset and a second subset of a plurality of subsets of contacts associated with the identifiable entity;
processing the data request in accordance with data processing information maintained in a data store, the data processing information comprising plan information maintained on behalf of identifiable entities;
verifying a first association of a plurality of associations between the specified contact and the identifiable entity based, at least in part, on the plurality of subsets of contacts, wherein each association of the plurality of associations corresponds to a respective subset of the plurality of subsets of contacts containing the specified contact;
determining communication cost information corresponding to the first association between the specified contact and the identifiable entity based, at least in part, on the data request and the plan information, wherein the first association corresponds to the first subset of contacts and wherein the communication cost information distinguishes the first association from at least one remaining association of the plurality of associations;
determining organizational criteria corresponding to a second association of the plurality of associations between the specified contact and the identifiable entity based, at least in part, on the data request and group information, wherein the second association corresponds to the second subset of contacts and wherein the organizational criteria distinguish the second association from at least one remaining association of the plurality of associations;
generating response information comprising the communication cost information corresponding to the first association and identifying a set of applications or executable components associated with the organizational criteria corresponding to the second association; and
transmitting the response information,
wherein the method is implemented by a computing system under control of executable program code.

31. The method as recited in claim 30, further comprising identifying the first subset of contacts based, at least in part, on a specification of at least one identifiable entity.

32. The method as recited in claim 31, wherein identifying the first subset of contacts includes identifying a subset of contacts common to two or more identifiable entities.

33. The method as recited in claim 30, further comprising identifying contact description information for the specified contact as included in the first subset of contacts.

34. The method as recited in claim 30, further comprising identifying group-based information based, at least in part, on the organizational criteria, the organizational criteria corresponding to group selection information.

35. The method as recited in claim 30, wherein determining the organizational criteria comprises deriving the organization criteria from a specification of a set of contacts included in the data processing information maintained in the data store.

36. The method as recited in claim 30 further comprising transmitting the response information in accordance with the application protocol interface.

37. The computer-implemented method as recited in claim 30, further comprising identifying the second subset of contacts.

* * * * *